Feb. 28, 1933.    R. GUYER    1,899,268

EGG TRAY

Filed March 28, 1930    4 Sheets-Sheet 1

Inventor
Reynolds Guyer
By Caswell & Sagaard
Attorneys

Feb. 28, 1933.  R. GUYER  1,899,268
EGG TRAY
Filed March 28, 1930  4 Sheets-Sheet 2

Inventor
Reynolds Guyer
By Caswell & Sagaard
Attorneys

Feb. 28, 1933.      R. GUYER      1,899,268
EGG TRAY
Filed March 28, 1930     4 Sheets-Sheet 3
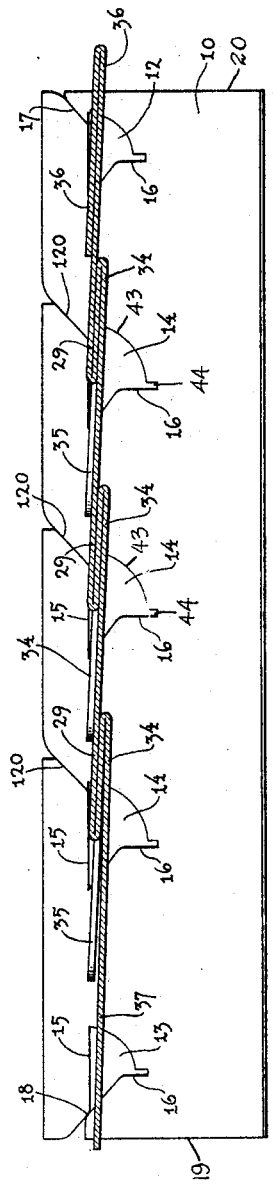
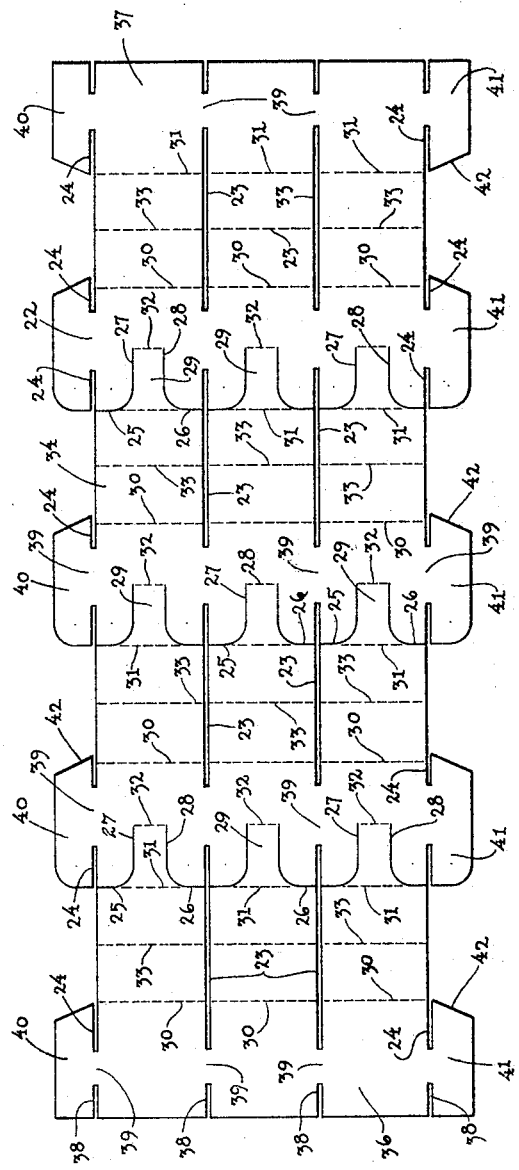
Inventor
Reynolds Guyer
By Caswell & Fagaard
Attorneys Feb. 28, 1933.    R. GUYER    1,899,268
EGG TRAY
Filed March 28, 1930    4 Sheets-Sheet 4
Fig. 9
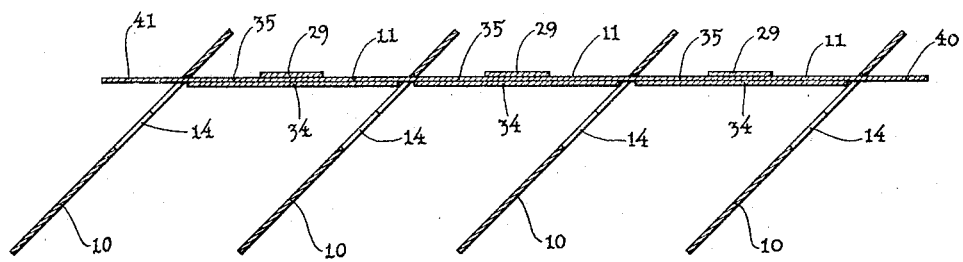
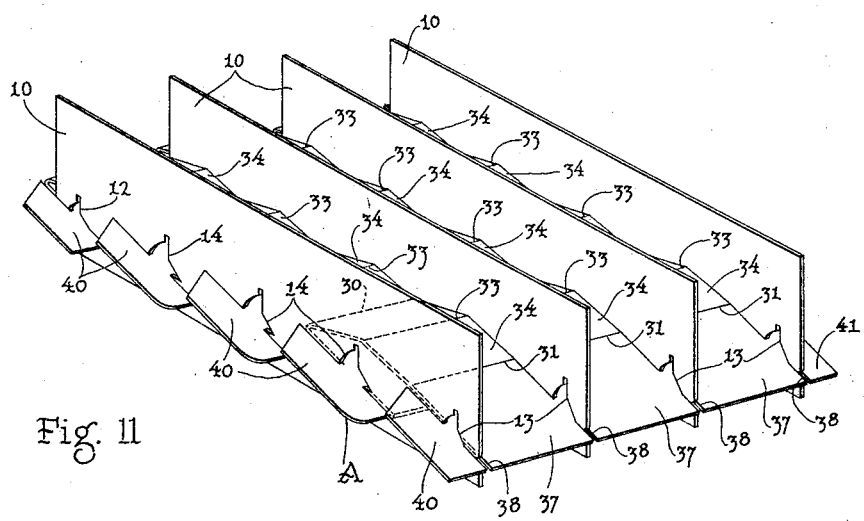
Fig. 11
Inventor
Reynolds Guyer
By Caswell & Lagaard
Attorneys Patented Feb. 28, 1933

1,899,268

UNITED STATES PATENT OFFICE

REYNOLDS GUYER, OF ST. PAUL, MINNESOTA, ASSIGNOR TO WALDORF PAPER PRODUCTS COMPANY, OF ST. PAUL, MINNESOTA, A CORPORATION OF MINNESOTA

EGG TRAY

Application filed March 28, 1930. Serial No. 439,623.

My invention relates to egg trays and has for its object to provide an egg tray in which the eggs may be supported in a manner to prevent breakage thereof in handling.

Another object of the invention resides in providing a number of spaced dividers or supports and in mounting between said supports spacers for holding said dividers apart.

An object of the invention resides in constructing said spacers so as to form hangers or slings for holding the eggs in suspension between said dividers.

A still further object of the invention resides in pivoting said spacers to said supports in a manner to permit of movement thereof to absorb shocks imparted to the tray.

Another object of the invention resides in forming all of the hangers between each pair of dividers of a single sheet of material.

A feature of the invention resides in forming the aligning hangers between successive dividers of a single sheet of material.

An object of the invention resides in forming the dividers with openings and in constructing the spacers with tongues adapted to extend into said openings for pivotally attaching said spacers to said dividers.

Another object of the invention resides in constructing said dividers and hangers so that the same may be readily collapsed into a substantially planiform state.

Another object of the invention resides in hingedly connecting said spacers to said dividers in such a manner that said spacers may swing in a certain direction to lie in a common plane and said dividers may thereafter swing in another direction to lie in substantially the same plane.

A still further object of the invention resides in constructing the successive openings in said dividers with aligning edges and with other edges at right angles thereto, said tongues on said spacers being movable within said openings to lie along either of the edges thereof.

A feature of the invention resides in forming said dividers with slits extending from one of the edges thereof to said openings to permit of the insertion of the tongues on said spacers into said openings.

An object of the invention resides in constructing adjacent hangers between each pair of dividers with overlying portions hingedly connected together.

Another object of the invention resides in constructing each hanger with a bottom and with a wall bent outwardly therefrom, and in forming the other edge of said bottom with a strap hingedly connected to the wall of the adjoining hanger at a point intermediate the attached and free edges of said wall.

Another object of the invention resides in forming said tongues on said walls.

A still further object of the invention resides in forming the walls of corresponding aligning hangers between adjacent dividers continuous through the tongues thereof.

Other objects of the invention reside in the novel combination and arrangement of parts and in the details of construction hereinafter illustrated and/or described.

In the drawings:

Fig. 5 is a developed view of the formed blank from which the spacers or hangers are constructed.

Fig. 9 is a sectional view taken on line 9—9 of Fig. 8.

Fig. 10 is a sectional view taken on line 10—10 of Fig. 8.

Fig. 11 is an inverted perspective view of the structure shown in Fig. 8 with the spacers partially erected and the dividers fully erected.

In the shipment of eggs through the mails and otherwise, considerable breakage and damage frequently occurs. The instant invention overcomes these difficulties by providing an egg tray in which the eggs are individually suspended so as to prevent breakage or damage when the container is roughly handled.

Figure 6:
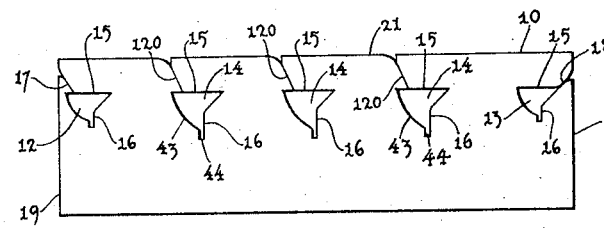
Fig. 6 is a developed view of the formed blank for the dividers.

My invention proper consists of a number of dividers, which are illustrated in Fig. 6 and designated at 10 and which are interconnected through a number of spacers 11 to form a unitary tray structure indicated in its entirety at A.

The dividers 10 are constructed of strips of cardboard or similar sheet material which are formed with openings 12 and 13 at the ends thereof and with other intervening openings 14. These openings serve to receive portions of the spacers 11 whereby said dividers are held properly spaced from one another to form the unitary tray structure. The openings 12, 13 and 14 are spaced apart the distance between the egg compartments of the tray A and are formed with edges 15 arranged in alignment with one another, and with edges 16 extending at right angles thereto. The function of these edges will be later described in detail. The dividers 10 are further formed with slits 17 and 18 which extend from the edges 19 and 20 of said dividers to the openings 12 and 13 and which permit of the insertion of portions of the spacers 11 into said openings. In a similar manner the dividers 10 are constructed with other slits 20 which extend from the upper edges 21 of said dividers to the openings 14 permitting of the insertion of other portions of the spacer structure into said openings as will be presently described.

The various spacers 11 as previously stated are constructed in the form of hangers or slings which are all formed from a single blank indicated in its entirety at 22 in Fig. 5. This blank is cut with a series of slots 23 intermediate the ends thereof and with similar slots 24 near the ends thereof which slots are spaced from one another a distance equal to the distance between the compartments of the egg tray A and which when the structure is erected receive portions of said dividers and hold the same properly spaced. It will be noted that the slots 23 and 24 are in alignment in both directions and that there are as many groups of slots as there are rows of compartments in the tray. The blank 22 is further cut between corresponding ends of the slots 23 and 24 along transverse lines 25 and 26 and along longitudinal lines 27 and 28 which longitudinal lines remain spaced throughout their extent to form straps 29 connecting adjoining portions of the hangers. Each section of the blank 22 forming one of the hangers is scored along a transverse line 30 a short distance from one end of the slots 23 and 24, along another line 31 coinciding with the lines of severance 25 and 26, and across the straps 29 as indicated at 32, the last named score mark being at the ends of the cuts 27 and 28. In addition each section of the blank is further scored as indicated at 33 intermediate the score marks 30 and 31. When the blank is properly folded along these various score marks, each hanger is formed with a V-shaped bottom 34 having an upstanding wall 35 issuing therefrom at one end and a strap 29 connected to the other end of said bottom and hingedly connected along the score lines 32 to the upstanding wall of the adjoining hanger. The end walls 36 and 37 are left blank as shown to completely house the structure when the same is assembled.

Figure 7:
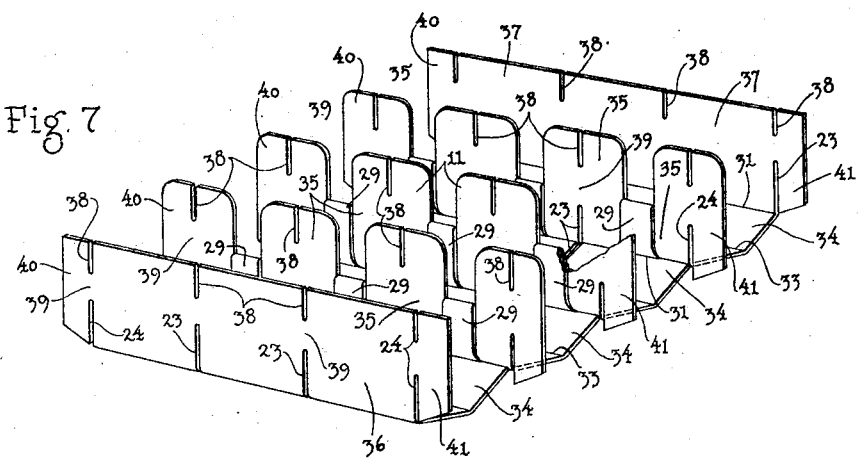
Fig. 7 is a perspective view of the blank shown in Fig. 5 folded into erected position, but detached from the structure shown in Fig. 6.

Upon the folding of the structure as shown in Fig. 7, the slots 23 and 24 extend through the bottoms 34 and partially up the walls 35 and leave notches 38 above said slots to form tongues 39 connecting the portions of the blank 22 between adjacent sections of the tray. It will be noted that the extreme portions 40 and 41 of the blank 22 outside of the slots 24 are considerably narrower than the intervening portions forming the various spacers or hangers for supporting the eggs. These portions of the blank serve merely for the purpose of holding the end dividers in place and are constructed of a width just sufficient to withstand the strain imparted thereto. Upon the exterior of the tray it does not become necessary to continue the bottoms 34 for which reason the portions of said bottoms indicated at 42 outside of the slots 24 have been removed as best shown in Fig. 5 so that the portions 41 and 40 merely form keys for holding the outer dividers 10 in place.

In assembling the device the blank 22 is first folded as shown in Fig. 7. The dividers 10 are next applied to the structure so folded either individually or collectively by inserting the slit portions 17, 18 and 20 thereof into the slots 23 and 24. During such insertion the parts of the divider are spread apart so that the tongues 39 may pass through said slits and enter into and be retained within the openings 12, 13 and 14 of said dividers as clearly shown in Fig. 1. In such position the dividers 10 form two of the walls of the egg compartments while the walls 35 of the spacers 11 form the other walls of said compartments. The bottoms 34 of said spacers furthermore provide the bottoms for supporting the eggs so that the compartments are closed on five sides thereof. It will be noted that the structures formed by the walls 35, the bottoms 34, and the straps 29 which carry the eggs, are in the nature of slings, and that the same are suspended from the ends of said walls 35 in a manner to permit of swinging said structures within the openings 12, 13 and 14. At the same time the bottoms 34 being made V-shaped through the score marks 33, the said bottoms yield upon the application of downward pressure to the eggs in the various compartments and besides centering the eggs in the compartments, serve to cushion the same and prevent breakage thereof.

Figure 2:
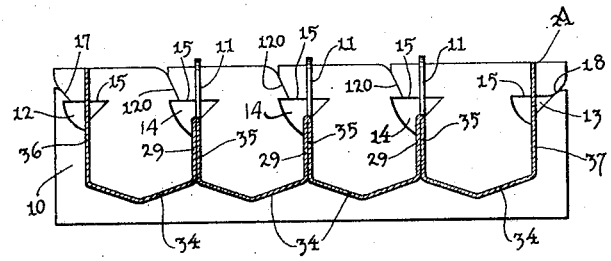
Fig. 2 is a sectional view taken on line 2—2 of Fig. 1.
Figure 1:
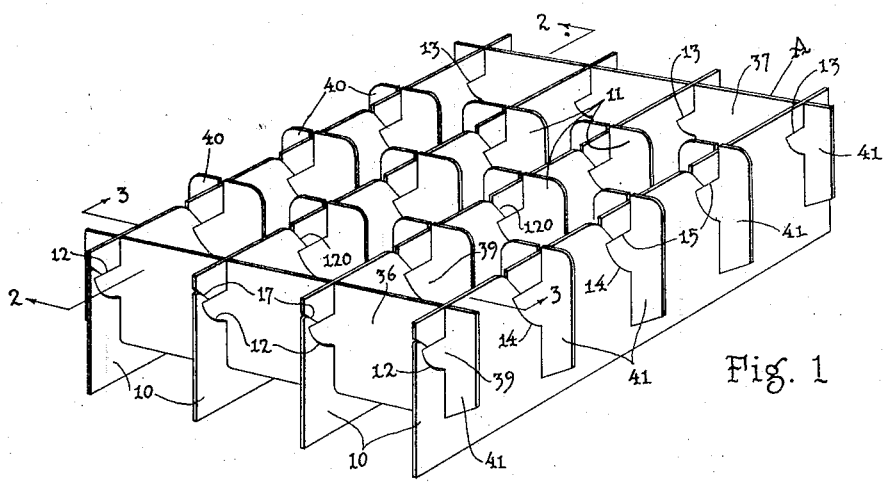
Fig. 1 is a perspective view of my invention in erected position.
Figure 4:
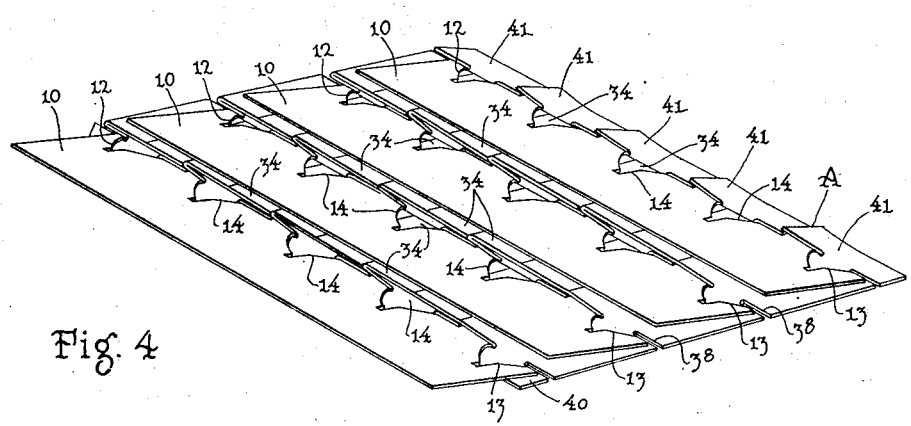
Fig. 4 is a perspective view of the invention in collapsed position.
Figure 8:
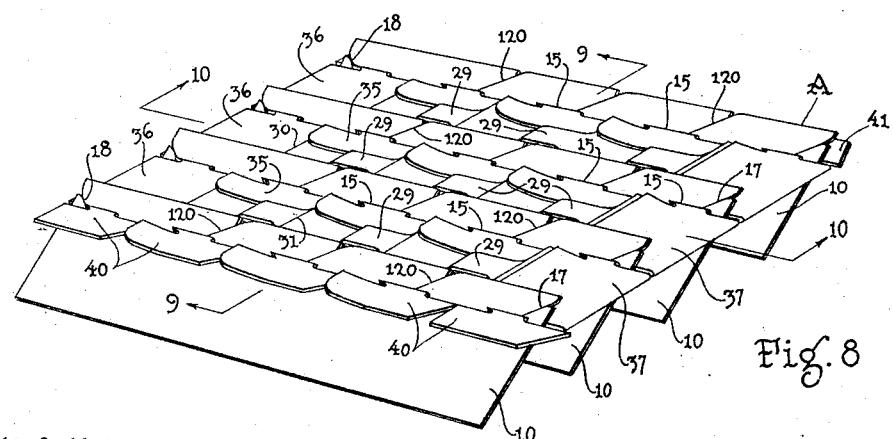
Fig. 8 is a perspective view showing the tray with the spacers collapsed and the dividers partially erected.
Figure 3:
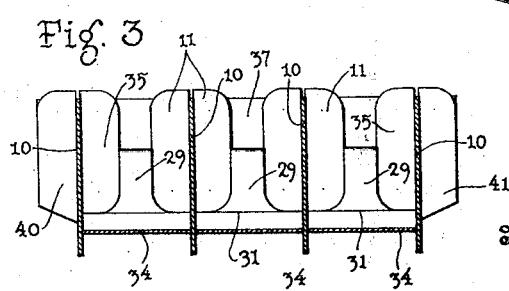
Fig. 3 is a sectional view taken on line 3—3 of Fig. 1.

After the tray has been assembled and is in the form shown in Fig. 1, the same is inverted and the bottoms 35 of the spacers 11 simultaneously folded upon themselves as shown in Fig. 11. This may be accomplished by employing a number of spaced members adapted to simultaneously engage said bottoms and slip in between the dividers 10, or the same may be accomplished manually if desired. After the spacers have been so folded to lie substantially in a common plane the dividers 10 may be folded in a direction at right angles to the direction of folding of said spacers to cause the entire structure to be collapsed into substantially a single plane. The parts while being so folded are shown in Fig. 8 in which the spacers are in collapsed position and the dividers are in partly folded position. After the structure has been collapsed into a substantially planiform state the same may be packed together with other similar collapsed trays into a small compact parcel.

When it is desired to erect the tray the following procedure is adopted. The dividers 10 are first brought into proper position. This may be accomplished by running the finger across the same to swing them into position as shown in Fig. 11. If after the tray has been partially erected as shown in Fig. 11 the same is inverted from the position shown in this figure to its normal position and dropped upon the table or upon any other desirable surface the spacers 11 will be caused to become partially erected swinging out of their normal plane. This locks the dividers 10 in proper position and said spacers may be further erected as shown in Fig. 1 by manually moving the same into the desired position. The same result may also be accomplished upon the insertion of the eggs into the various compartments which will shift the spacers and bring the parts in proper relation.

It is to be noted that in the movement of the spacers 11 from collapsed to erected position, the tongues 39 thereof swing within the openings 12. To facilitate such swinging said openings are constructed with arcuate edges 43 which give sufficient freedom to permit of the desired movement. To hold the parts in erected position slots 12 and 13 and 14 adjacent the edges 16 thereof are formed with notches 44 which receive the lowermost portions of the tongues 39 and hold the same in proper position. When the structure is to be collapsed the tongues swing within the openings 12, 13 and 14 until the same lie against the aligning edges 15 of said openings. When in this position the dividers 10 may be swung about the edges 15 as pivots until the entire structure is collapsed and in a substantially planiform state.

Although I have described my invention for use in the handling of eggs, it can be readily understood that the device may by constructing the same in proper sizes and proportions be used for shipping or storing fruits, vegetables, or any other similarly shaped commodities which would be injured if piled loosely adjacent one another during such handling.

In the use of the invention the trays are erected as described and the eggs or other commodities to be carried thereby are placed in the various compartments formed by the dividers and spacers previously described. When so placed, said commodities are suspended in much the same manner as if carried by slings and are so prevented from being injured during rough handling of the container in which the trays are placed. The trays when packed in the carton or container are placed one upon the other with the dividers of superimposing trays arranged at right angles to one another. In this manner the entire weight of the various trays is transmitted through the dividers which form supports for the same. By arranging the various trays in this manner it becomes unnecessary to accurately locate the trays one upon the other, since the intersecting dividers do not need exact positioning.

Although the egg tray shown is of a size to hold one dozen eggs, yet it can be readily comprehended that the same may be made of any size and to hold as many articles as required.

The invention is highly advantageous in that an extremely simple and effective device is provided for the handling of eggs and similar commodities. The eggs or other commodities on account of being suspended in the hangers are less apt to become injured during rough handling of the trays. An entire tray may be readily removed from the carton without picking up the eggs individually as becomes necessary when an egg flat and the ordinary type of divider is used. The entire tray can be constructed from less material than the ordinary divider and egg flat, and being constructed entirely from flat stock, can be made much cheaper than other forms of egg carriers in which the egg is cushioned. The tray when erected is extremely rigid and other trays can be readily piled upon the same without danger of crushing the structure of the lowermost tray or injuring the eggs carried therein.

Changes in the specific form of my invention as herein described may be made within the scope of what is claimed without departing from the spirit of my invention.

Having described my invention what I claim as new and desire to protect by Letters Patent is:

1. An egg tray comprising a plurality of spaced supports, a plurality of slings disposed between said supports and hingedly attached near their upper ends to said supports, the corresponding slings between adjoining supports being connected together.

2. An egg tray comprising a pair of spaced supports, a plurality of slings disposed between said supports and pivoted near their upper ends to said supports, said slings being foldable intermediate the ends thereof to swing into a common plane while attached to said supports.

3. An egg tray comprising a pair of spaced supports, a plurality of slings disposed between said supports and pivoted at both sides near their upper ends to said supports, said slings being foldable intermediate the ends thereof to swing into a common plane, said supports being swingable in a different direction than said slings and into the same plane.

4. An egg tray comprising a pair of spaced supports, each of said supports having openings therein near the upper ends thereof, a plurality of slings disposed between said supports, said slings each having a bottom and sides connected thereto, said sides being each formed with tongues extending through said openings, said slings being further foldable intermediate their length and swinging through said openings to fold into a common plane.

5. An egg tray comprising a pair of spaced members, a plurality of slings disposed adjacent one another and between said members, said slings each having a bottom with a wall hingedly connected thereto at one side, and a strap formed entirely from said wall and of a width less than that of said wall and connected to the bottoms of the adjacent sling at the edge thereof opposite the wall of said sling.

6. An egg tray comprising a pair of spaced members, a plurality of slings disposed between said members, said slings being constructed of a single piece of sheet material cut to form bottoms with walls bent outwardly therefrom, said walls being cut intermediate their lateral edges to form straps bent outwardly therefrom, said straps being integrally connected to said bottoms at the edges thereof opposite to the edges from which said walls issue and to said walls at localities intermediate the free and attached edges thereof, and means for suspending said slings from said members through the walls of said slings.

7. An egg tray comprising a plurality of spaced vertical supports, a plurality of slings disposed between said supports and having vertical walls, said slings being foldable intermediate the ends thereof to swing together with the walls of said slings into a common horizontal plane, and means for hingedly connecting said spaced supports to said slings for swinging movement of said supports into the same horizontal plane as said slings.

8. An egg tray comprising a plurality of spaced vertical members, a plurality of vertical slings disposed between said members, said slings being swingable along horizontal axes to fold into a common plane, said supports being similarly swingable about other horizontal axes disposed at right angles to said first named axes for further swinging into the plane of said slings.

9. An egg tray comprising a plurality of elongated spaced dividers, said dividers having openings therein disposed intermediate the edges thereof, each of said openings having an edge parallel to the edge of the divider in which it is disposed, slings disposed between said dividers and having tongues extending into said openings, said tongues being swingable within said openings along horizontal lines in the aforementioned edges of said openings to bring said slings in a common plane, said dividers being swingable along the aforementioned edges of said openings to bring said dividers into the same plane as said slings.

10. An egg tray comprising a plurality of spaced members, a plurality of slings disposed between said members and constructed of a single sheet of material cut to form bottoms with walls bent outwardly therefrom, said walls being cut to form straps bent outwardly therefrom intermediate the edges of said spaced members, said straps being integrally connected to said bottoms at the edges thereof opposite the edges from which said walls issue and to said walls at localities thereof intermediate the free and attached edges thereof, said walls having slots formed therein intermediate said straps to leave tongues therebetween, said members having openings therein for the reception of said tongues.

11. An egg tray comprising a plurality of spaced members, a plurality of slings disposed between said members and constructed of a single sheet of material cut to form bottoms with walls bent outwardly therefrom, said walls being cut to form straps bent outwardly therefrom intermediate the edges of said spaced members, said straps being integrally connected to said bottoms at the edges thereof opposite the edges from which said walls issue and to said walls at localities thereof intermediate the free and attached edges thereof, and means on said walls between said straps for connecting said walls to said spaced members.

12. An egg tray comprising a pair of spaced members, a plurality of V-shaped slings disposed between said members, means for hingedly connecting said slings to said members at the upper ends of said slings, said slings being disconnected from said members at their lower ends and being foldable through the V-shaped portions thereof and being further jointly swingable about the hinge means at their upper ends to fold into a common plane.

13. An egg tray comprising a pair of dividers formed of sheet material and having openings therein, said openings having two edges angularly disposed relative to one another, said openings extending from the aforementioned edges thereof in the same direction, and a plurality of interconnected slings having tongues extending into said openings, said tongues being swingable in the same direction from one of the edges of the openings to the other of said edges to bring the slings from an extended position to a collapsed position.

14. An egg tray comprising a pair of spaced members, a plurality of interconnected slings disposed between said members, said slings being each formed with a bottom and side walls connected thereto, said members having equally spaced openings, and tongues on said side walls for engagement with said openings to form pivots for swingably supporting said slings from said members, said bottoms being hinged to said side walls, the length of said bottoms between the hinges thereof being substantially equal to the distance between the axes of the pivots of said side walls to said members to cause said slings to fold into a common plane when the side walls are swung on their pivots.

In testimony whereof I have affixed my signature.

REYNOLDS GUYER.